(12) United States Patent
Bashford et al.

(10) Patent No.: US 12,235,356 B2
(45) Date of Patent: Feb. 25, 2025

(54) SONAR SYSTEM AND POSITION INDICATOR THEREFOR

(71) Applicant: CS Pro Solutions LLC, Mooresville, NC (US)

(72) Inventors: Nicholas Bashford, Salisbury, NC (US); Carson Orellana, Mooresville, NC (US)

(73) Assignee: CS Pro Solutions LLC, Mooresville, NC (US)

( * ) Notice: Subject to any disclaimer, the term of this patent is extended or adjusted under 35 U.S.C. 154(b) by 127 days.

(21) Appl. No.: 18/176,603

(22) Filed: Mar. 1, 2023

(65) Prior Publication Data

US 2023/0333246 A1 Oct. 19, 2023
US 2024/0302527 A2 Sep. 12, 2024

Related U.S. Application Data

(60) Provisional application No. 63/332,377, filed on Apr. 19, 2022.

(51) Int. Cl.
*G01S 15/96* (2006.01)
*G01S 7/521* (2006.01)

(52) U.S. Cl.
CPC ............. *G01S 15/96* (2013.01); *G01S 7/521* (2013.01)

(58) Field of Classification Search
CPC .................................. G01S 15/96; G01S 7/521
USPC .......................................................... 367/93
See application file for complete search history.

(56) References Cited

U.S. PATENT DOCUMENTS

| | | | |
|---|---|---|---|
| 11,567,194 B1* | 1/2023 | Gluszyk | G01S 7/56 |
| 11,694,667 B2* | 7/2023 | Vance | G10K 11/004 |
| | | | 367/173 |
| 11,880,002 B1* | 1/2024 | Helms, III | G01S 7/521 |
| 2016/0377716 A1* | 12/2016 | Proctor | G01S 7/6245 |
| | | | 367/88 |
| 2021/0278514 A1* | 9/2021 | Hughes | G01S 7/521 |
| 2021/0362818 A1* | 11/2021 | Ridl | B63H 20/12 |
| 2022/0373662 A1* | 11/2022 | Crawford | G01S 17/66 |

* cited by examiner

*Primary Examiner* — Kerri L McNally
(74) *Attorney, Agent, or Firm* — Shumaker, Loop & Kendrick, LLP; Brandon C. Trego (57) ABSTRACT

A sonar system mounted to a platform is disclosed. The sonar system includes a positioning shaft rotatably connected to the platform; a motor operably connected to the positioning shaft, wherein operation of the motor causes the positioning shaft to rotate; a transducer connected to a distal end of the positioning shaft such that rotation of the positioning shaft causes the transducer to rotate, the transducer defining an axis aligned with a sonar field projected by the transducer; and a position indicator connected to and extending from the positioning shaft to a position viewable by a user, the position indicator being aligned with the axis of the transducer to provide a visual indication to the user of a direction of the sonar field projected by the transducer.

18 Claims, 8 Drawing Sheets

SONAR SYSTEM AND POSITION INDICATOR THEREFOR

TECHNICAL FIELD AND BACKGROUND OF THE INVENTION

The present invention relates to the field of scanning instrumentation having a directionally defined field of view, and more specifically to such instrumentation that includes a movable transducer configured to position the field of view as desired.

SUMMARY OF THE INVENTION

Sonar-based instrumentation ("sonar") is conventionally mounted to a platform such as a boat and used to locate targets such as fish and underwater structures. Conventional sonar includes a transducer and a controller with a display screen. The controller and display are generally mounted in a position convenient to an operator and the transducer is mounted below the water surface such that it is generally not visible to the operator. Sonar that includes a movable transducer can be used to determine the position of the targets more accurately than sonar that includes a fixed position transducer. In this regard, a directionally movable transducer can be used to focus on a first position and then moved to focus on a second, different position.

One problem with sonar that includes a directionally movable transducer is that it can be difficult to determine the actual position and thus target location of the transducer relative to the platform, such as a boat, because the orientation of transducer cannot be seen by the operator.

According to one aspect of the technology described herein, a sonar system mounted to a platform includes a positioning shaft rotatably connected to the platform; a motor operably connected to the positioning shaft, wherein operation of the motor causes the positioning shaft to rotate; a transducer connected to a distal end of the positioning shaft such that rotation of the positioning shaft causes the transducer to rotate, the transducer defining an axis aligned with a sonar field projected by the transducer; and a position indicator connected to and extending from the positioning shaft to a position viewable by a user, the position indicator being aligned with the axis of the transducer to provide a visual indication to the user of a direction of the sonar field projected by the transducer.

According to another aspect of the technology described herein, a position indicator for a transducer of a sonar system includes a clamp; an indicator stick connected to the clamp; and wherein the clamp secures the position indicator in a fixed position relative to a rotatable shaft of the sonar system, the position indicator being fixed to the rotatable shaft such that the indicator stick is aligned with an axis of the transducer to provide a visual indication of a direction of a sonar field projected by the transducer.

According to another aspect of the technology described herein, a position indicator for a transducer of a sonar system includes a clamp; an indicator stick operably connected to the clamp, the indicator stick being moveable between a storage position and a use position; wherein the clamp secures the position indicator in a fixed position relative to a rotatable shaft of the sonar system, the position indicator being fixed to the rotatable shaft such that, in the use position, the indicator stick is aligned with an axis of the transducer to provide a visual indication of a direction of a sonar field projected by the transducer.

BRIEF DESCRIPTION OF THE DRAWINGS

The invention may be best understood by reference to the following description in conjunction with the accompanying drawing figures in which.

DESCRIPTION OF THE PREFERRED EMBODIMENT AND BEST MODE

Referring now specifically to the drawings, a sonar system 10 is provided according to the present invention. The sonar system 10 is configured to provide a sonar derived view of targets such as fish and underwater structures to an operator. Such a system can be used as a fish-finder, as is conventionally known.

Figure 1:
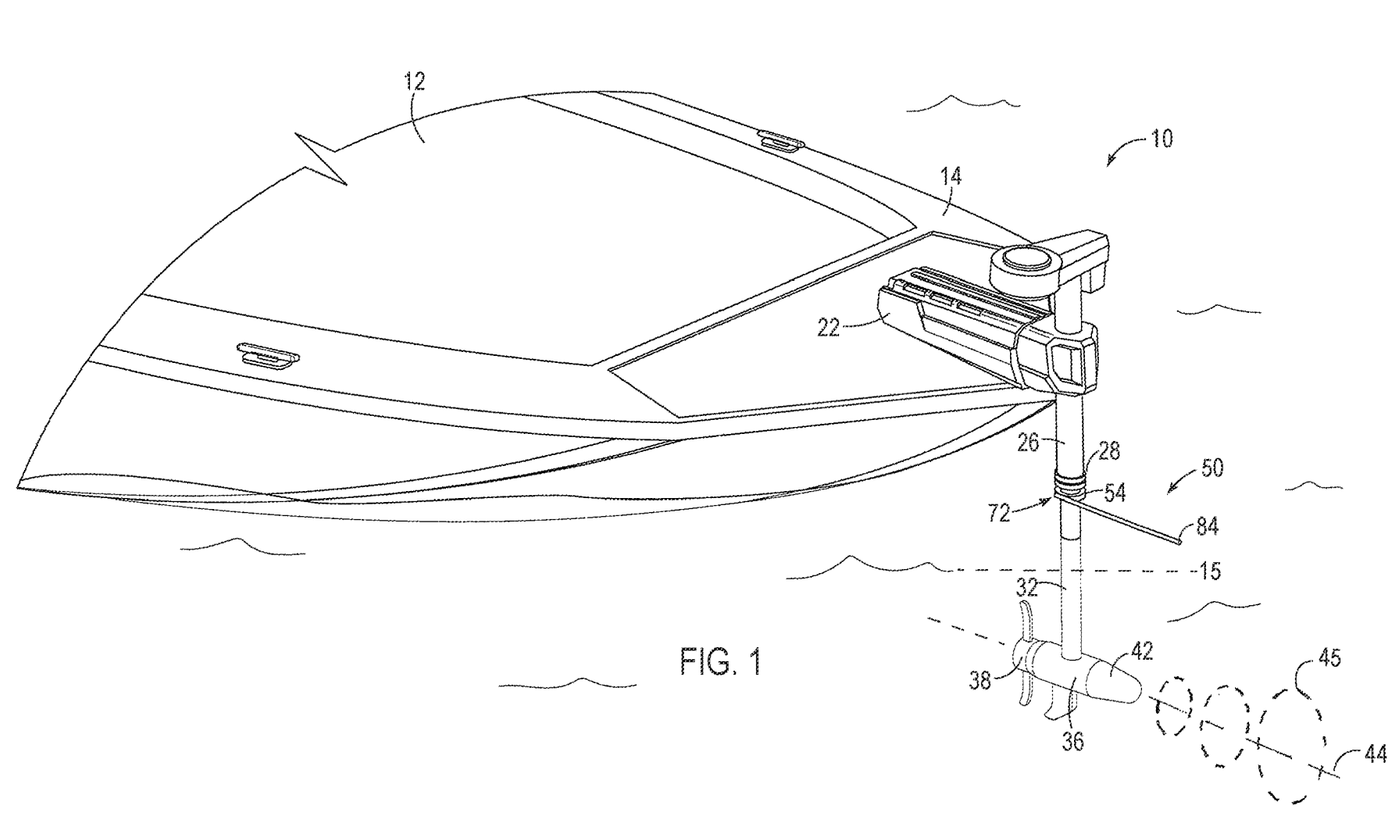
FIG. 1 shows a perspective view of a sonar system attached to a boat where a sonar system includes the presently disclosed technology.

Referring now to FIG. 1, the sonar system 10 is mounted to a boat 12 that serves as a platform for the sonar system 10. It should be understood that a boat is just one example of platform and that any suitable type of platform may be used. In particular, the sonar system 10 is mounted to the boats bow 14 as shown in FIG. 1. The sonar system 10 includes a sonar mounting bracket 22 that is configured to support a motor 24. The motor 24 is electrically connected to a controller that includes a display screen and an operator interface (not shown). The motor 24 is attached to a support shaft 26 which in turn is supported by the mounting bracket 22. The support shaft 26 extends from the motor 24 to a bushing 28.

A positioning shaft 32 is configured to be moved relative to the support shaft 26 by operation of the motor 24 and extends from the support shaft 26 at the bushing 28. The positioning shaft 32 extends to an end to which is attached a propellor motor 36. A propellor 38 is connected to a first end of the motor 36 such that the motor 36 rotates the propellor to move the boat 12 through the water. A transducer 42 is connected to a second opposing end of the motor 36. As shown, the transducer 42 is in the form of a projector tip or nose cone. The motor 36 and transducer 42 are electrically connected to the controller. Motor 24 rotates the positioning shaft to change the direction of the transducer and the direction propellor 38 moves the boat 12. The transducer 42 defines an axis 44. As discussed further below, a sonar field, represented by ellipses 45, can be projected from the transducer 42 and is aligned with the axis 44. As illustrated in FIG. 1, the sonar system 10 is in the form of a trolling motor with transducer 42 connected thereto.

As seen in FIG. 1, a position indicator 50 extends from the positioning shaft 32 above a water level that is indicated by dashed line 15. In this regard, the position indicator 50 is visible above the water level indicated by line 15 when the transducer 42 is submerged below the water level.

Figure 2:
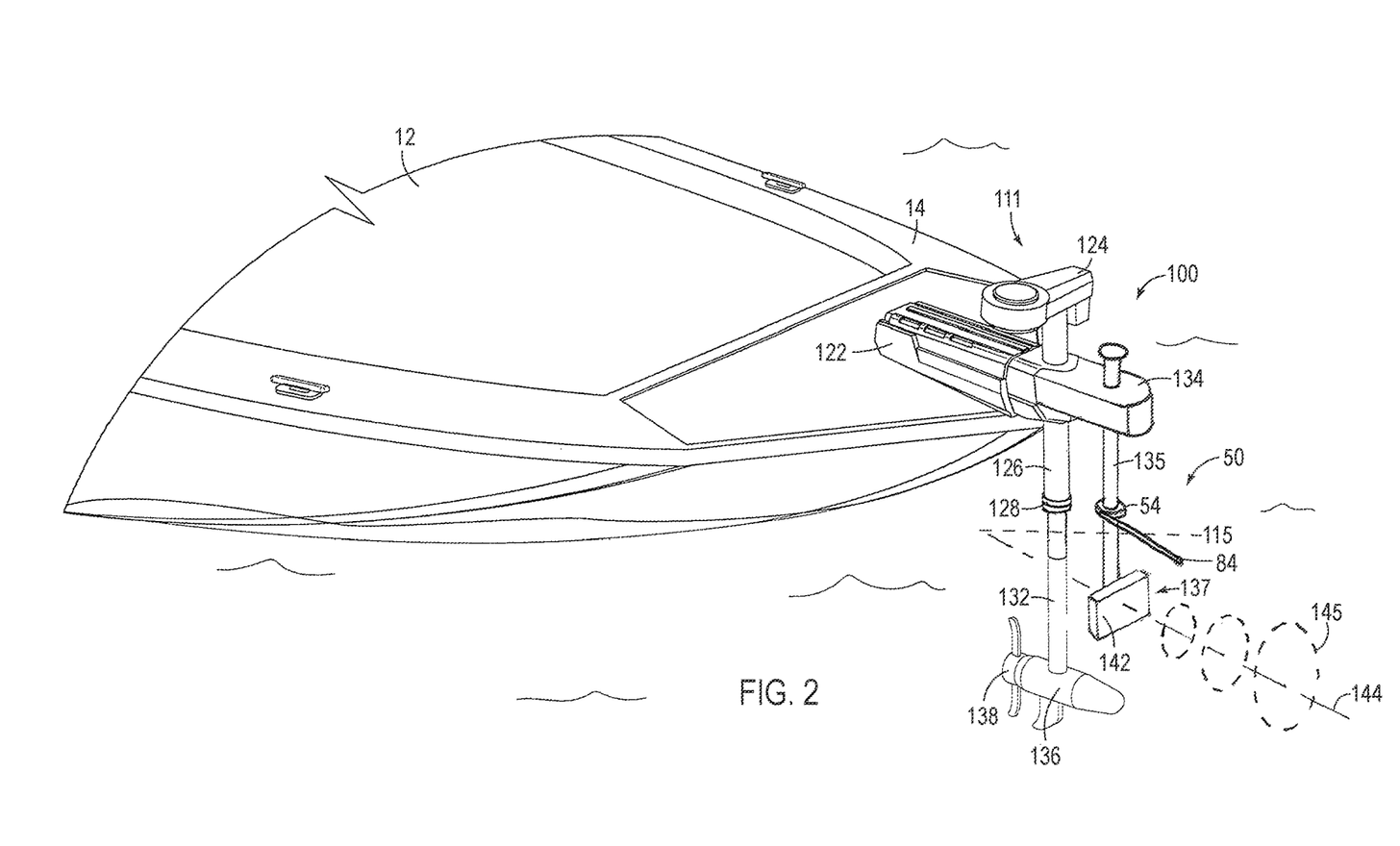
FIG. 2 shows a perspective view of a sonar system attached to a boat where a sonar system includes the presently disclosed technology.
Figure 3:
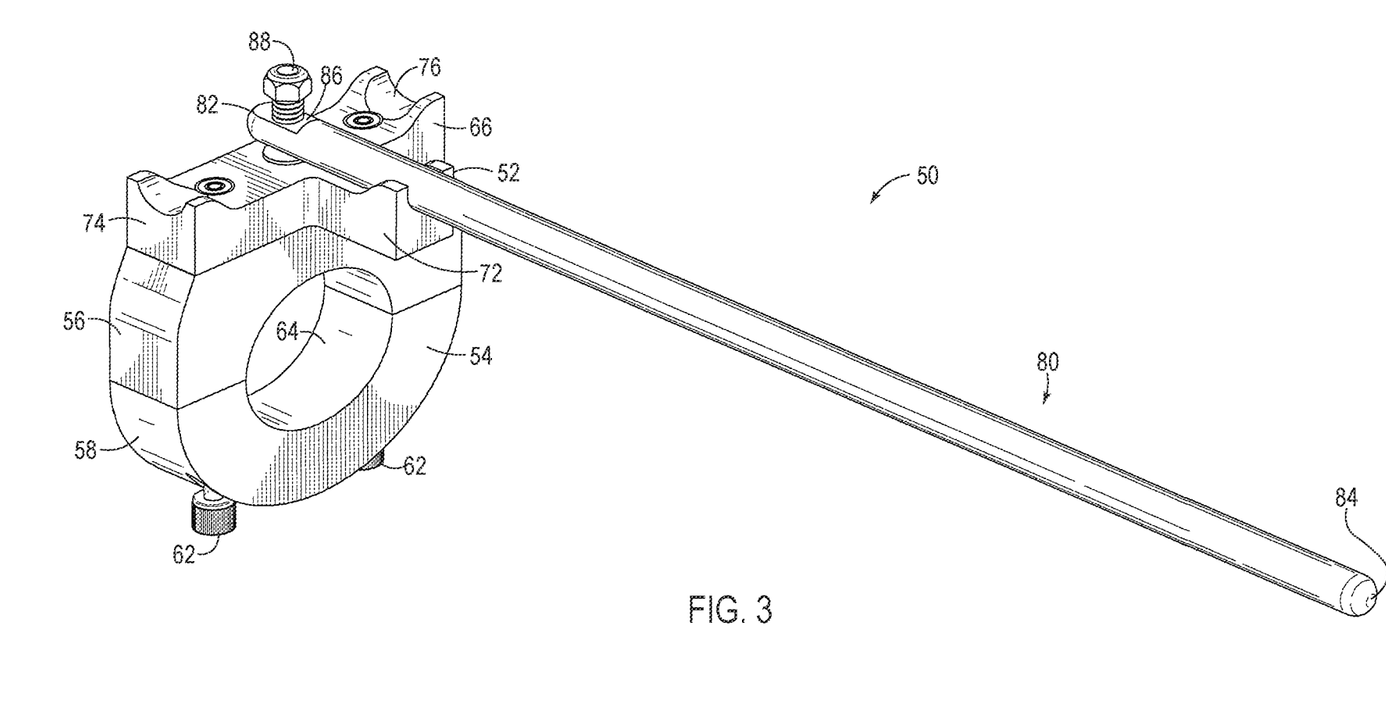
FIG. 3 shows a perspective view of the presently disclosed technology.
Figure 4:
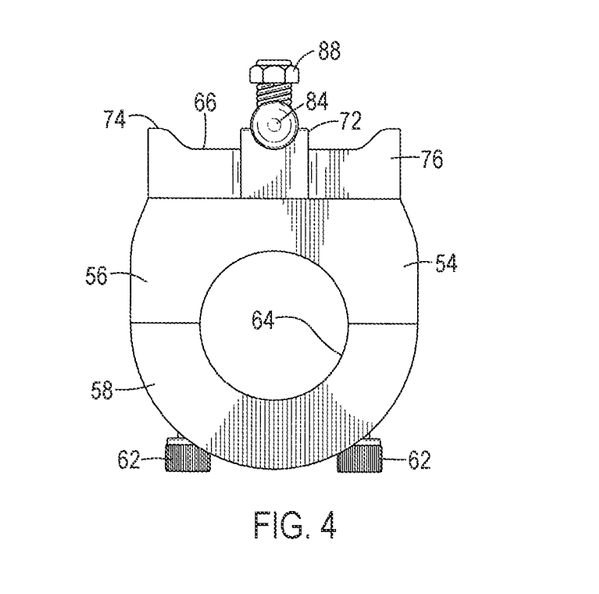
FIG. 4 shows a forward view of the presently disclosed technology.
Figure 5:
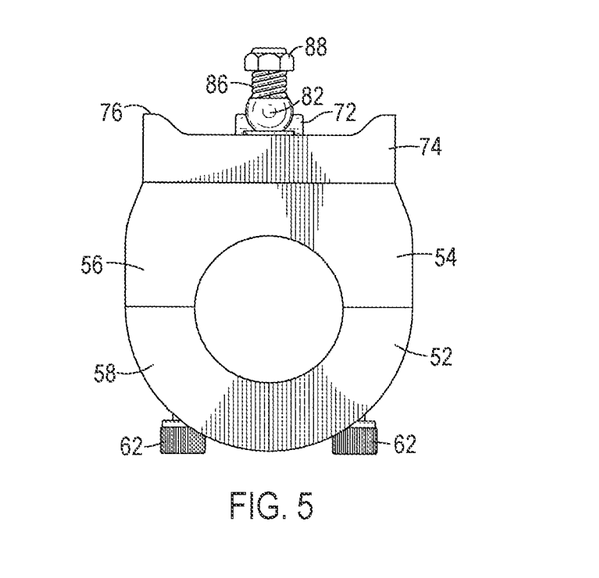
FIG. 5 shows aft view of the presently disclosed technology.
Figure 6:
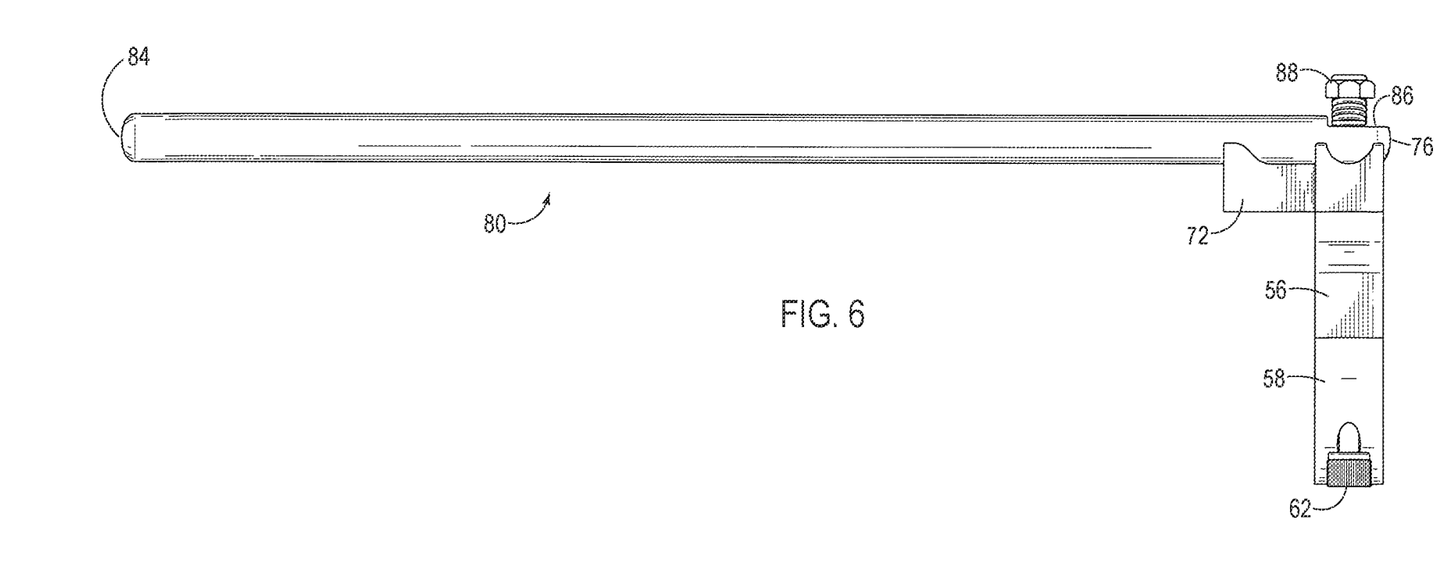
FIG. 6 shows a side view of the presently disclosed technology.
Figure 7:
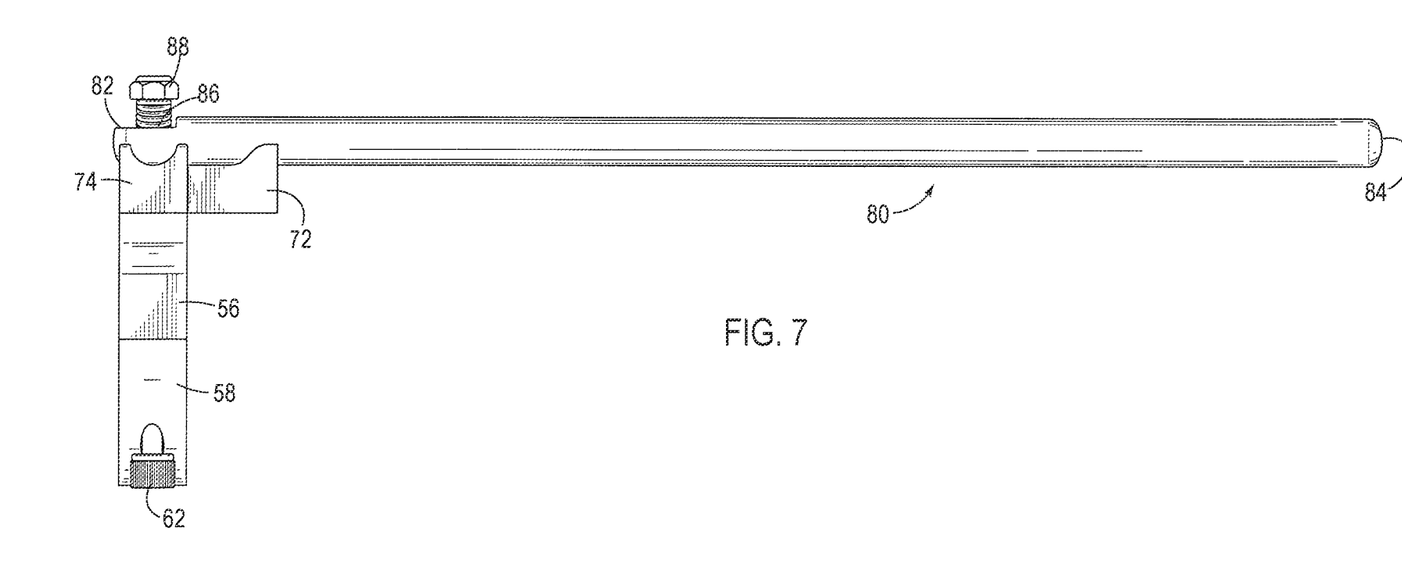
FIG. 7 shows a side view of the presently disclosed technology showing the side opposite that shown in FIG. 5.
Figure 8:
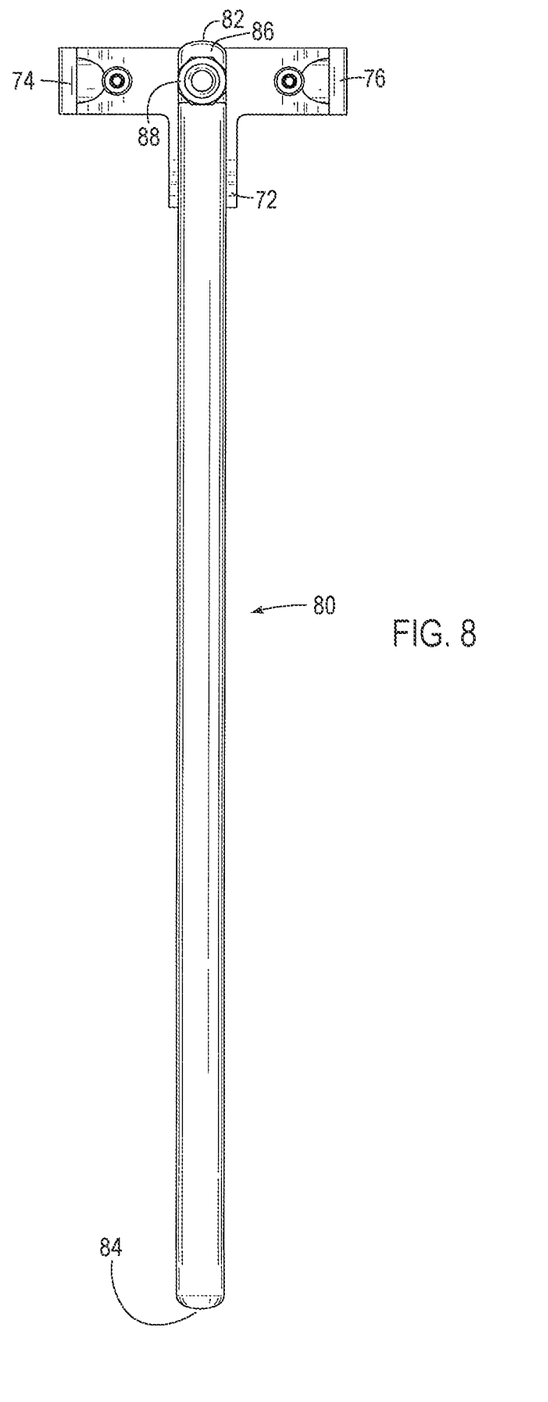
FIG. 8 shows a top view of the presently disclosed technology.
Figure 9:
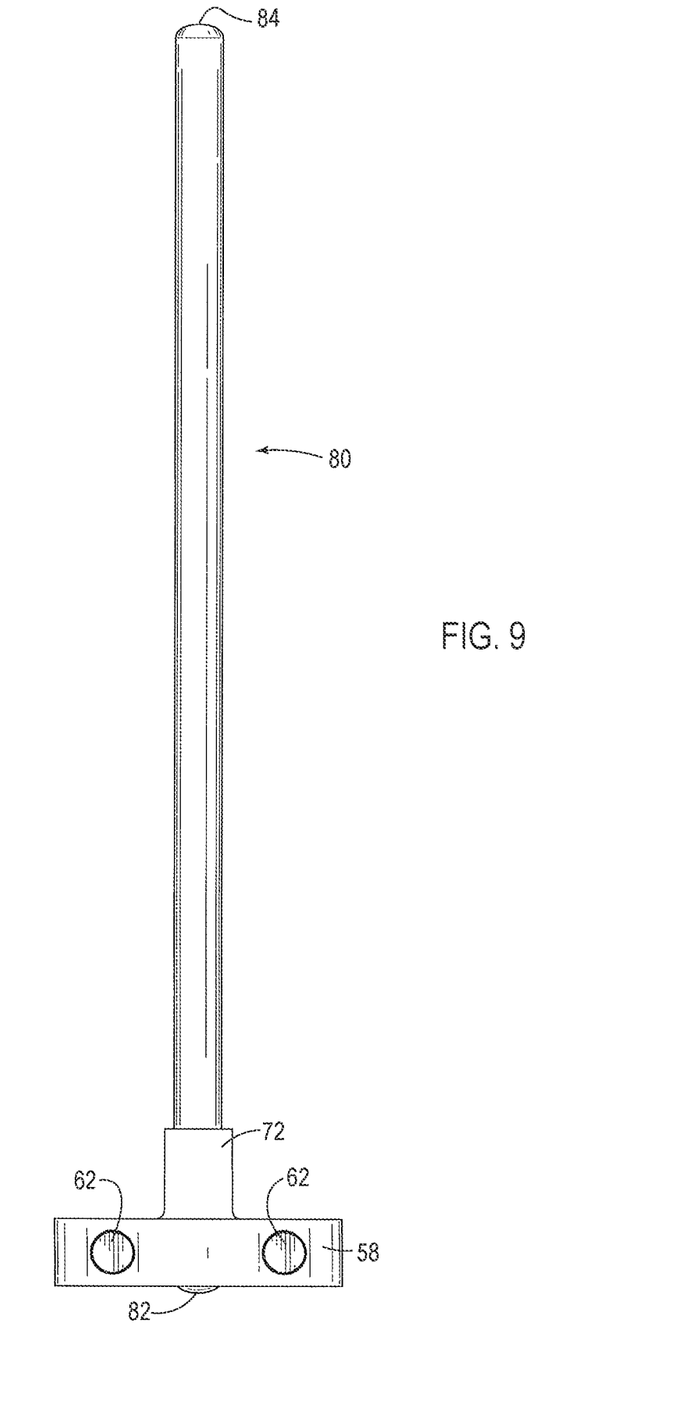
FIG. 9 shows a bottom view of the presently disclosed technology.

Alternatively, as shown in FIG. 2, the sonar system may be separate from the trolling motor. For example, a sonar system 100 may be connected to a trolling motor 111. In this example, the sonar system 100 is separate from the trolling motor 111 to permit a user to propel the boat in one direction and scan with the sonar system 100 pointed in a different direction. Like the trolling motor of FIG. 1, the trolling motor 111 includes a mounting bracket 122, a motor 124, a support shaft 126, a positioning shaft 132, a bushing 128, a propellor motor 136, and a propellor 138. Unlike FIG. 1, sonar system 100 does not have a transducer connected to an end of the propellor motor 136.

Sonar system 100 includes a motor 134 electrically connected to a controller that includes a display screen and an operator interface (not shown). A positioning shaft 135 is operably connected to the motor 134 to allow the motor 134 to rotate the shaft. A transducer 142 is positioned at a distal end 137 of the positioning shaft 135. The transducer 142 defines an axis 144 from which a sonar field, represented by ellipses 145, can be projected from the transducer 142.

As seen in FIG. 2, position indicator 50 extends from the positioning shaft 135 above a water level that is indicated by dashed line 115. In this regard, the position indicator 50 is visible above the water level indicated by line 115 when the transducer 142 is submerged below the water level.

Referring now to FIGS. 3-9, the position indicator 50 includes a bracket 52 and an indicator stick 80. For purposes of clarity, FIGS. 3-9 will be discussed with respect to FIG. 1. It should be appreciated that the discussion also applies with respect to positioning shaft 135 of FIG. 2. The bracket 52 is configured to receive the positioning shaft 32 in a clamp 54. The clamp 54 is configured to retain the bracket 52 in a fixed position relative to the positioning shaft 32. The clamp 54 includes a body section 56 and a tightening section 58. At least one fastener such as a screw 62 is configured to attach the tightening section 58 to the body section 56 of the clamp 54. The clamp 54 defines a receiver 64 that is configured to receive the positioning shaft 32 therethrough. The relative position of the clamp body section 56 and the tightening section 58 can be adjusted by the screws 62 such that the bracket 52 is securely attached to the positioning shaft 32.

The bracket 52 includes an alignment block 66 that is positioned on the clamp body section 56 opposite the tightening section 58. As illustrated, the alignment block 66 is attached to the clamp body section 56 by fasteners 68. It should be appreciated that the clamp body section 56 and the alignment block 66 can be manufactured as one unitary piece.

The alignment block 66 includes three alignment saddles: a storage saddle 72, a first alignment saddle 74, and a second alignment saddle 76. The three alignment saddles are radially arrayed relative to each other such that the first alignment saddle 74 is 90° away from the storage saddle 72 and the second alignment saddle 76 is 90° away from the storage saddle 72 in the opposite direction. In this regard, the first alignment saddle 74 is positioned in line with this second alignment saddle 76 such that each extend from opposite sides of the storage saddle 72.

Continuing to refer to FIGS. 3-9, the indicator stick 80 extends from a base end 82 to a tip 84. The indicator stick 80 has a land area 86 defined near the base end 82. A locking screw 88 is configured to pass through a hole configured through the land area 86 of the indicator stick 80 such that the indicator stick 80 can be fixedly attached to the attachment block 66. via a threaded connection. Locking screw 88 can be removed and the indicator stick 80 reposition such that it extends through anyone of the storage saddle 72, the first alignment saddle 74, and the second alignment saddle 76. In this manner, the indicator stick 80 can be positioned parallel to the positioning shaft 32 when the storage saddle 72 is utilized or perpendicular to the positioning shaft 32 when either one of the first alignment saddle 72 or the second alignment saddle 74 is utilized.

It should be noted that all or a portion of the indicator stick 80 can be coated, wrapped, painted or otherwise enhanced to have a predetermined color or pattern. Such color or pattern can be chosen to enhance the visibility of the indicator stick 80 relative to the water and the general weather environment. The position indicator 50 can be formed of a material such as aluminum, stainless steel, plastic, or the like.

It should be appreciated that the below discussion of operation applies to both sonar system 10 and sonar system 100. For clarity, only sonar system 10 will be discussed.

The present invention can be better understood by description of the operation thereof. The sonar system 10 is attached to the boat 12 at its bow 14. It should be appreciated that sonar system 10 may be mounted at other locations on the boat, such as the transom. The position indicator 50 is attached to the positioning shaft 32 of the sonar system 10. In this regard, the clamp 54 is opened by removing the tightening section 58. Positioning the clamp body section 56 around the positioning shaft 32 and tightening the screw 62 such that tightening section 58 is attached to the clamp body section 56 and the clamp 54 is firmly engaged with positioning shaft 32.

In a first configuration, the indicator stick 80 passes from the fastener 88 through the storage saddle 72 such that the indicator stick 80 is generally parallel to the positioning shaft 32. In the first configuration transportation and storage of the sonar system 10 can be accomplished with less risk of damage to the position indicator 50 because the position indicator 50 is stored closely to the shaft 32.

In a second configuration, the indicator stick 80 passes from the fastener 88 through one of either the first attachment saddle 74 and the second attachment saddle 76. In the second configuration, the indicator stick 80 is oriented generally perpendicular to the positioning shaft 32 and generally parallel to the axis 44 of the transducer 42. This orientation of the indicator stick 80 being generally parallel to the axis 44 is accomplished by having screws 62 at least loosened such that clamp 54 can be positioned relative to the positioning shaft 32. In a preferred embodiment, the tip 84 of the indicator stick 80 is positioned on the same side as a projector tip of the transducer 42 relative to the positioning shaft 32.

When in this configuration, the indicator stick 80 points, or is directed toward, the same direction as the sonar field emitted from the transducer 42. Visual observation of the indicator stick 80 can then be used to identify the position of target shown by the sonar system 10 relative to the platform, i.e., the boat bow 14. This allows an operator such as a fisherman to quickly identify the direction of targets of either fish or structure which might shelter fish relative to the boat bow. In this way they can quickly make a cast in a direction that should have a higher chance of being successful.

A sonar system including an indicator stick for the indication of a transducer position relative to a platform, such as a boat, has been disclosed above. All of the features disclosed in this specification, and/or all of the steps of any method or process so disclosed, may be combined in any combination, except combinations where at least some of such features and/or steps are mutually exclusive.

Each feature disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends, or to any novel one, or any novel combination, of the steps of any method or process so disclosed.

We claim:

1. A sonar system mounted to a platform, comprising:
a positioning shaft rotatably connected to the platform;
a motor operably connected to the positioning shaft, wherein operation of the motor causes the positioning shaft to rotate;
a transducer connected to a distal end of the positioning shaft such that rotation of the positioning shaft causes the transducer to rotate, the transducer defining an axis aligned with a sonar field projected by the transducer; and
a position indicator connected to and extending from the positioning shaft to a position viewable by a user, the position indicator being aligned with the axis of the transducer to provide a visual indication to the user of a direction of the sonar field projected by the transducer, wherein the position indicator includes a clamp section configured to secure the position indicator to the positioning shaft and an indicator stick connected to the clamp section to provide visual indication of the direction of the sonar field.

2. The sonar system of claim 1, wherein the position indicator further includes a bracket section connected to the clamp section, the indicator stick being operably connected to the bracket section.

3. The sonar system of claim 1, wherein the clamp section is adapted to secure the position indicator to the positioning shaft.

4. The sonar system of claim 2, wherein the bracket section secures the indicator stick in one of a storage position or a use position where the indicator stick is aligned with the axis of the transducer.

5. A position indicator for a transducer of a sonar system, comprising:
a clamp;
an indicator stick connected to the clamp; and
wherein the clamp secures the position indicator in a fixed position relative to a rotatable shaft of the sonar system, the position indicator being fixed to the rotatable shaft such that the indicator stick is aligned with an axis of the transducer to provide a visual indication of a direction of a sonar field projected by the transducer.

6. The position indicator of claim 5, wherein the clamp is secured to the rotatable shaft by at least one fastener.

7. The position indicator of claim 5, wherein the clamp includes first and second sections, the first and second sections engaging opposing sides of the rotatable shaft and connected together by at least one fastener, wherein tightening the fastener forces the first and second sections together, thereby clamping the position indicator to the rotatable shaft.

8. A position indicator for a transducer of a sonar system, comprising:
a clamp;
an indicator stick operably connected to the clamp, the indicator stick being moveable between a storage position and a use position;
wherein the clamp secures the position indicator in a fixed position relative to a rotatable shaft of the sonar system, the position indicator being fixed to the rotatable shaft such that, in the use position, the indicator stick is aligned with an axis of the transducer to provide a visual indication of a direction of a sonar field projected by the transducer.

9. The position indicator of claim 8, wherein the clamp includes first and second sections secured together by at least one fastener.

10. The position indicator of claim 8, further including an alignment block connected to the clamp, the alignment block being adapted to secure the indicator stick in one of the storage or use positions.

11. The position indicator of claim 10, wherein the indicator stick is rotatable relative to the alignment block between the storage and use positions.

12. The position indicator of claim 10, wherein the alignment block includes three alignment saddles for securing the indicator stick in either a use position or a storage position, the three alignment saddles including:
a first use position saddle;
a second use position saddle; and
a storage position saddle.

13. The position indicator of claim 12, wherein the three alignment saddles are radially arrayed relative to each other, the storage position saddle being ninety degrees from the first use position saddle and ninety degrees from the second use position saddle.

14. The position indicator of claim 12, wherein when the indicator stick is positioned in the use position saddle, the indicator stick is parallel to the rotatable shaft and wherein when the indicator stick is positioned in one of the first and second use position saddles, the indicator stick is perpendicular to the rotatable shaft.

15. A sonar system connected to a platform, comprising:
a rotatable shaft connected to the platform;
a position indicator extending from the rotatable shaft, the position indicator being visible to a user;
a transducer connected to a distal end of the rotatable shaft such that rotation of the rotatable shaft causes the transducer to rotate, the transducer defining an axis aligned with a sonar field projected by the transducer; and
wherein the position indicator is aligned with the axis of the transducer to provide a visual indication of a direction of a sonar field projected by the transducer, the position indicator being moveable between a use position and a storage position.

16. The sonar system of claim 15, wherein a motor is operably connected to the rotatable shaft, wherein operation of the motor cause the rotatable shaft to rotate.

17. A sonar system connected to a platform, comprising:
a rotatable shaft connected to the platform;
a position indicator operably connected to the rotatable shaft, the position indicator being visible to a user;
a transducer connected to a distal end of the rotatable shaft such that rotation of the rotatable shaft causes the transducer to rotate, the transducer defining an axis aligned with a sonar field projected by the transducer; and wherein the position indicator is aligned with the axis of the transducer to provide a visual indication of a direction of a sonar field projected by the transducer, the position indicator being moveable between a use position and a storage position.

18. The sonar system of claim 17, wherein the platform is a boat.

* * * * *